United States Patent
Maringer et al.

(10) Patent No.: US 7,203,836 B1
(45) Date of Patent: Apr. 10, 2007

(54) METHOD AND DEVICE FOR THE MUTUAL AUTHENTICATION OF COMPONENTS IN A NETWORK USING THE CHALLENGE-RESPONSE METHOD

(75) Inventors: Gunter Maringer, Bonn (DE); Walter Mohrs, Bonn (DE); Frieder Pernice, deceased, late of Gross-Zimmern (DE); by Edith Pernice, legal representative, Gross-Zimmern (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/462,616

(22) PCT Filed: Jul. 10, 1998

(86) PCT No.: PCT/DE98/01922

§ 371 (c)(1),
(2), (4) Date: Apr. 3, 2000

(87) PCT Pub. No.: WO99/03285

PCT Pub. Date: Jan. 21, 1999

(30) Foreign Application Priority Data

Jul. 10, 1997 (DE) ................................ 197 29 611
Jul. 15, 1997 (DE) ................................ 197 30 301

(51) Int. Cl.
*H04L 9/00* (2006.01)
(52) U.S. Cl. ...................... 713/169; 713/170; 713/171; 713/155
(58) Field of Classification Search ................ 713/155, 713/169–171
See application file for complete search history.

(56) References Cited

U.S. PATENT DOCUMENTS

| 5,535,276 A | * | 7/1996 | Ganesan | 713/155 |
| 5,544,245 A | * | 8/1996 | Tsubakiyama | 713/171 |
| 5,740,361 A | * | 4/1998 | Brown | 713/201 |
| 6,021,203 A | * | 2/2000 | Douceur et al. | 380/252 |

OTHER PUBLICATIONS

Clark, A Survey of Authentication Protocol Literature: Version 1.0, Nov. 17, 1997, pp. 44 and p. 48.*
Schneier, Applied Crytopgraphy, 1996, 2nd Edition, p. 173.*
Burrows, A logic of authentication, Feb. 28, 1989, pp. 17-18.*
Shieh et al., An Efficient Authentication Protocol for Mobile Networks, 1999, Journal of Information Science and Engineering, pp. 505-520.*

* cited by examiner

*Primary Examiner*—Kim Vu
*Assistant Examiner*—Paula Klimach
(74) *Attorney, Agent, or Firm*—Cooper & Dunham LLP

(57) ABSTRACT

A method for mutual authentication of components in a network using a challenge-response method, including the steps of requesting at least one data pair including a first random number and a first response from an authentication center, passing the first random number to a terminal which uses an internally stored key and the first random number to calculate the first response, sending the calculated first response to the network, sending a second random number from the terminal to the network, and responding to the second random number with a second response calculated in the authentication center. The first response sent from the terminal to the network is also used as the second random number, and the network has previously requested the second response from the authorization center together with the first random number and the first response as a triplet data set.

24 Claims, 1 Drawing Sheet

METHOD AND DEVICE FOR THE MUTUAL AUTHENTICATION OF COMPONENTS IN A NETWORK USING THE CHALLENGE-RESPONSE METHOD

BACKGROUND OF THE INVENTION

The prior art includes the so-called challenge-response method. In this method, a random number (challenge) is sent by the authenticating component (N=network) to the component (M=mobile station) to be authenticated and is converted into a response using an algorithm (A) and a secret key (K) which is known to both components. The expected response is calculated in the network N using the same key K and the same algorithm A; a match between the response sent back by M and the response calculated in N proves the authenticity of M.

Mutual authentication is achieved according to the prior art by the above sequence being carried out with the opposite role distribution.

Accordingly, in the known challenge-response method, the fixed network passes a challenge to the mobile station M, and the mobile station M answers with a response which has been calculated by using a computation method which is implemented in the mobile station and which includes a secret key K. This key K is unique. This means that only this mobile station can respond in the way expected of it, provided it is authenticated as being "authentic". No other mobile station (M) can simulate this key.

A disadvantage of the previous method is that the entire authentication method can be verified only and exclusively in the AUC (authentication center), that is to say, in practice, in the computation center.

Specifically, for security reasons, it has been found to be advantageous in system architectures to control A and K at a central point (in the authentication center=AUC), with the authenticating point N (which carries out the authenticity check) having transmitted to it in advance only challenge/response pairs (possibly a number of them as a stockpile) for the purpose of authentication.

The challenge/response pairs transmitted from the AUC to the network (on request from the network in the form of a so-called "duplet request") are thus already to a large extent calculated in advance "as a stockpile" and, when the response arrives from the mobile station M during the authentication process, the two responses are compared. If they match, this thus ends the authentication method for the mobile station M with the network N.

The known methods from the prior art accordingly provide for the mobile stations to authenticate themselves with the network. This results in a risk of the network being simulated by unauthorized persons and thus of the relevant mobile station M being "spoofed by" the simulated network, with a mirror-image of the mobile station M being created in the process, but in this case for the "right" network N. In this unallowed situation, the M would authenticate itself with the simulated network N, thus allowing the unauthorized operator on the simulated network to call up non-public data from this mobile station M.

As one example, the GSM network should be mentioned which, at the moment, carries out only single-ended authentication (M authenticates itself with N). The TETRA Standard which is also known allows double-ended authentication.

The method is explained in the following text in order to provide a better description of the terms "Challenge 1," "Response 1," "Challenge 2," and "Response 2" used below:

The Challenge 1 is used to authenticate the mobile station M with the network N. As soon as this authentication has been successfully completed, the mobile station M requests reverse authentication, such that a check is now carried out as to whether the present network N is also really the authorized network and not a network being simulated in an unallowed manner. The aim is thus to authenticate the network N with the mobile station M. In this case, the mobile station M sends a Challenge 2 to the network, which passes the Challenge 2 on to the AUC where the Response 2 is calculated from it, and this is in turn sent to the network N, which passes the Response 2 to the mobile station. If the mobile station finds that the Response 2 which it has itself calculated matches the received Response 2, the authentication process is thus successfully ended. This authentication pair is referred to as Challenge 2/Response 2.

A disadvantage of mutual authentication in such system architectures is that the challenge sent by M cannot be converted into the response in N, but only in the AUC which, in some circumstances, leads to considerable time delays between the N-AUC-N data transfer and the on-line computation operation in the AUC.

SUMMARY OF THE INVENTION

The invention relates to a method and an apparatus for mutual authentication of components in a network using the challenge-response method. In particular, the invention relates to mutual authentication of a terminal, preferably a mobile station, with the network, and vice versa. Authentication is used to check the authenticity of the component to be authenticated.

The following text uses the term "mobile station," but this should not be regarded as a limitation. The term "mobile station" is intended to cover all possible terminals, including stationary terminals, such as individual users of a computer in a wire-based system.

DETAILED DESCRIPTION OF THE INVENTION

Figure 1:
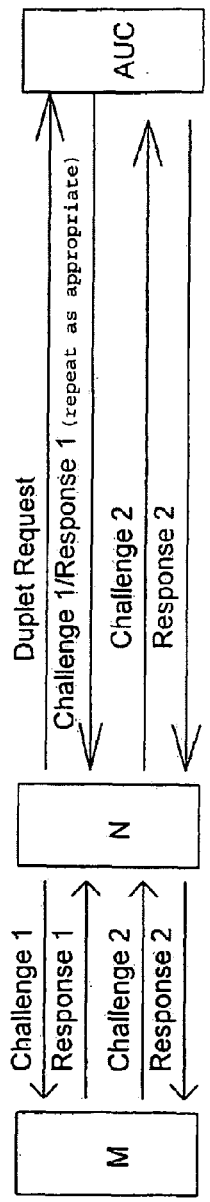
FIG. 1 shows, schematically, an authentication method according to the prior art.

The invention is based on the object of improving the known method for authentication of components in a network, in particular in a GSM network, such that this method is considerably speeded up.

In order to achieve the stated object, the method is distinguished by the fact that the Response 1 sent back by the mobile station M is simultaneously used by the network N as the Challenge 2, and this has the advantage that the Response 2 (as the response to the Challenge 2) is also calculated and transmitted by the AUC at the same time as the abovementioned challenge/response pairs. This avoids the time delay which would occur if N had to supply the Response 2 only after the Challenge 2 had arrived at the AUC.

The invention thus provides that, in order to identify the authenticity of the network N, the mobile station no longer produces a Challenge 2 internally and sends it to the network but, by equating the Response 1 to the Challenge 2, a mutual match between M and N already exists via the expected Challenge 2. The network can thus produce a Response 2 at this stage and send it to the mobile station, which compares this Response 2 with the value it has itself calculated and, if they match, recognizes the network as being "authentic".

The important factor in this case is thus that the Response 1 sent from the mobile station to the network is at the same time used as the Challenge 2 from this mobile station, but which the mobile station no longer needs to send into the network, and waits for the Response 2 of the network.

Specifically, the network already knows the Challenge 2 from the mobile station, since the Response 2 has already been calculated internally. The network can thus calculate the Response 2 at this stage.

According to the invention, the mutual authentication of the mobile station with the network and, after this, the authentication of the network with the mobile station are no longer carried out immediately successively in time, with a relatively high time penalty, but the two authentication tests are now interleaved with one another in time.

Complete data transmission of a test number (Challenge 2) is thus avoided since, according to the invention, the Challenge 2 can be saved and need no longer be transmitted. The separate transmission of the Response 2 by the network is saved due to the fact that the network sends the Response 2 to the mobile station at the same time that the Challenge 1 is sent. This is justified by the fact that the network already knows in advance what the Challenge 2 from the mobile station will be, that is to say the network can thus also send the Response 2 to the mobile station immediately. The network thus transmits the data pair Challenge 1/Response 2 to the mobile station in a single data transmission. This means that the mobile station can identify the authenticity of N even before M has authenticated itself with N.

There are two different configurations in this case:

In a first embodiment, the network transmits the Challenge 1 to the mobile station. The mobile station M answers with the Response 1. Once a large number of triplet data packets (triplet=Challenge 1/Response 1/Response 2) have been transmitted in advance from the AUC to the network, the network N also knows the Response 1 of the mobile station M in advance. However, since it knows the Response 1, it also knows the Challenge 2. The mobile station now no longer sends the Challenge 2 to the network, but the network answers the Response 1 from M with the Response 2. However, only the "real" network has this knowledge; a simulated, unallowed network does not have this knowledge. The network N has thus authenticated itself with the mobile station by the transmission of a single data packet (Challenge 1/Response 2), saving the transmission of the second data packet (Challenge 2).

In this case, it is advantageous that the Response 2 is a function of the Response 1. This means that the Response 2 can be calculated from the Response 1=Challenge 2, provided the functional relationship is known. According to the prior art, the Response 2 was a function of the Challenge 2. According to the invention, the Challenge 2 need no longer be transmitted since Challenge 2=Response 1 and is a function of Challenge 1.

In the end, making the Response 1 equivalent to the Challenge 2 means that the Response 2 is also a function of the Challenge 1.

Accordingly, in the first refinement, the Challenge 1 and the Response 2 are sent to the mobile station M immediately successively in time.

A second refinement provides for the Challenge 1 and Response 2 to be sent jointly to the mobile station M, as a data packet.

The mobile station answers this with the Response 1, and the network now compares the Response 1 with the expected value of Response 1, while the mobile station compares the Response 2 with the internally calculated value of the Response 2.

In known systems (for example in the GSM network), the length of the response (32 bits) is shorter than the challenge random number (128 bits). In order to allow the response to be used at the same time as a challenge for authentication of N with M using the same algorithm A, it is necessary to increase the length of Response 1 to the length of 128 bits expected by the algorithm A.

This could be achieved by quadruple concatenation of Response 1 (4×32 bits=128 bits) or by filling out 128 bits in a previously defined manner (on a subscriber-specific basis or independently of the subscriber).

Proposals for the subscriber-specific filling-out process are:

1. Use of the complete computation result for the Response 1 before it has been shortened to 32 bits for transmission to the other station.

2. Filling out with defined bits from the Ki which is known in the M and AUC.

The advantage of both embodiments over the prior art is thus that the data traffic between the network and the mobile station on the one hand, as well as the data traffic between the network and the AUC is simplified, and thus speeded up. According to the prior art, four messages have to be sent backward and forward between the network and the mobile station M, namely the Challenge 1, Response 1, Challenge 2 and Response 2.

Furthermore, the network must first transmit the Challenge 2 to the AUC, which must calculate the Response 2 and pass it to the network, and this is associated with a further time penalty.

According to the invention, time-consuming on-line interrogation from the network to the AUC is avoided. This is achieved in that the data packets required for this purpose from the AUC are called up even before the actual data traffic for authentication between the network and mobile station, and are buffer-stored for subsequent use in the network.

Such data packets (triplets) can be called up by the network from the AUC even well in advance (for example hours or days in advance). A common feature of both configurations in this case is that the Response 1 is used as the Challenge 2, and it is thus possible to dispense with the actual transmission of the Challenge 2.

A number of preferred exemplary embodiments will now be described in more detail with reference to the drawings. In this case, further features of the invention will become evident from the drawing and its description.

In the configuration shown in FIG. 1, the network N first of all requests data sets as duplet packets (duplet request) from the AUC.

These duplet packets contain data sets for the Challenge 1/Response 1. As soon as a mobile station M now wishes to authenticate itself with the network N, N first of all sends the data set Challenge 1 to M, which answers with the Response 1. If N finds that the two data sets match, the "authenticity" of M with N is thus proven.

Conversely, M now requests the authenticity test of N by M sending to N a Challenge 2 which N passes on to the AUC where the required Response 2 is calculated from this, which the AUC passes to N, which in turn sends this to M. M now compares the internally calculated Response 2 and the Response 2 received from N, and recognizes the authenticity of N if the two match.

Figure 2:
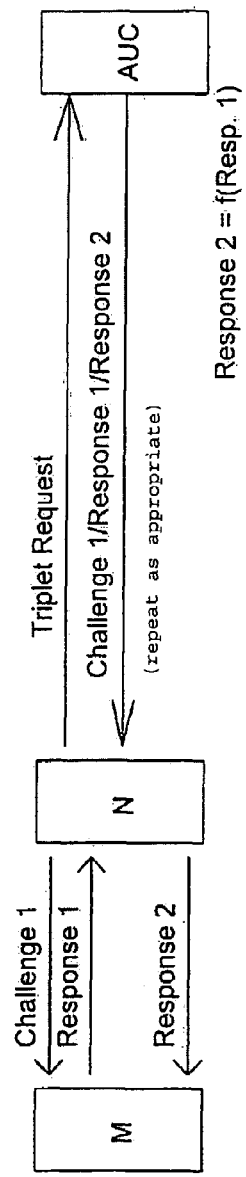
FIG. 2 shows a first embodiment for authentication according to the invention.

As has already been mentioned in the introduction, this convoluted data interchange places a severe load on the traffic between M and N on the one hand, and N and AUC on the other hand, and it is thus subject to time delays. This is where the first version of the new method as shown in FIG. 2 comes into play, which provides for N to request so-called triplet data sets in the form of Challenge 1/Response 1/Response 2 from the AUC. In this case, the data set Response 2 is a defined function of the data set Response 1, and can be calculated by means of an algorithm.

Such data sets are requested from the AUC a very long time before the handling of the data traffic from N with M and are stored in the form of multiple data sets in N. This avoids the necessity for on-line data traffic between N and the AUC, as was required for the prior art shown in FIG. 1. In order to authenticate M with N, N first of all sends the Challenge 1 to M, which M answers with the Response 1. Once N has identified the data set Challenge 2 which is sent from M to N in the prior art, it is sufficient for N to send only the data set Response 2 to M for authentication with M. M has calculated the data set Response 2 internally and compares this with the Response 2 sent from N. If they match, the "authenticity" of N with M is thus proven.

Figure 3:
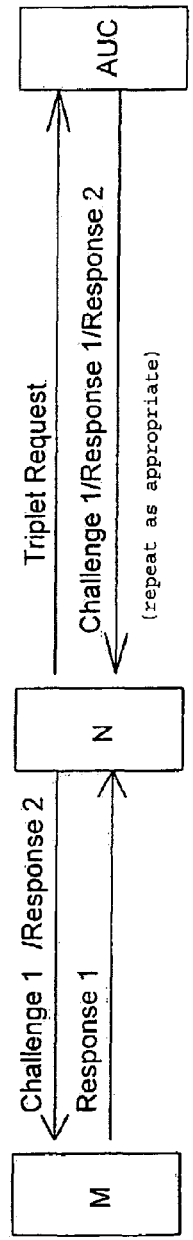
FIG. 3 shows a second embodiment for authentication according to the invention.

In contrast to the method shown in FIG. 2, the second embodiment of the method, shown in FIG. 3, provides for N to send the data set Challenge 1/Response 2 to M immediately and once. As soon as M sends back the data set Response 1, both authentication of M with N and, conversely, of N with M, are thus achieved.

The invention claimed is:

1. A method for mutual authentication of a terminal and a network comprising the steps of:
   receiving, at the network, a triplet data set from an authentication center, the triplet data set including a first random number (challenge 1), a first response (response 1) and a second response (response 2);
   sending the first random number (challenge 1) to the terminal;
   receiving, from the terminal, a first calculated response, calculated by the terminal based on the first random number (challenge 1), wherein the first calculated response is used as a second challenge (challenge 2);
   authenticating the terminal by matching the first calculated response with the first response (response 1);
   sending the second response (response 2) to the terminal; and
   wherein the network is authenticated by the terminal by matching a second calculated response, calculated by the terminal based on the first random number (challenge 1) with the second response (response 2).

2. The method of claim 1, wherein the terminal calculates the first calculated response from the first random number (challenge 1) using an internally stored key.

3. The method of claim 1, wherein the terminal calculates the second calculated response from the first random number (challenge 1) or from the first calculated response using an internally stored key.

4. The method of claim 1, wherein multiple triplet data sets are received from the authentication center and stored on the network as a stockpile to reduce the number of times triplet data sets must be received.

5. The method as claimed in claim 1, wherein to use the first calculated response of the terminal as the second challenge (Challenge 2), a shorter length of the first calculated response is filled out to make up a greater length of the second challenge (Challenge 2).

6. The method as claimed in claim 5, wherein the filling-out is performed on a subscriber-specific basis; and
   the complete length of the first calculated response is shortened before transmission.

7. The method as claimed in claim 5, wherein the first calculated response is filled out with defined bits from an internally stored key to make up the length of the second challenge (Challenge 2).

8. The method as claimed in claim 5, wherein the second challenge (Challenge 2) corresponds to the first calculated response before it was shortened.

9. The method as claimed in claim 1, wherein the network is a GSM network.

10. The method as claimed in claim 1, wherein the network is a wire-based network.

11. The method as claimed in claim 10, wherein components in the wire-based network are different monitoring units of computers which authenticate themselves with a central computer, and vice versa.

12. The method as claimed in claim 1, wherein the authentication center calculates the triplet data sets requested by the network and transmits the calculated triplet data sets to the network off-line and independently of time, on request by the network, and before data interchange between the network and the terminal.

13. A method for mutual authentication of a terminal and a network comprising the steps of:
   receiving, at the network, a triplet data set from an authentication center, the triplet data set including a first random number (challenge 1), a first response (response 1) and a second response (response 2);
   sending the first random number (challenge 1) and the second response (response 2) to the terminal as a single data set;
   receiving, from the terminal, a first calculated response, calculated by the terminal based on the first random number (challenge 1), wherein the first calculated response is used as a second challenge (challenge 2);
   authenticating the terminal by matching the first calculated response with the first response (response 1); and
   wherein the network is authenticated by the terminal by matching a second calculated response, calculated by the terminal based on the first random number (challenge 1) with the second response (response 2).

14. The method of claim 13, wherein the terminal calculates the first calculated response from the first random number (challenge 1) using an internally stored key.

15. The method of claim 13, wherein the terminal calculates the second calculated response from the first random number (challenge 1) or from the first calculated response using an internally stored key.

16. The method of claim 13, wherein multiple triplet data sets are received from the authentication center and stored on the network as a stockpile to reduce the number of times triplet data sets must be received.

17. The method as claimed in claim 13, wherein to use the first calculated response of the terminal as the second challenge (Challenge 2), a shorter length of the first calculated response is filled out to make up a greater length of the second challenge (Challenge 2).

18. The method as claimed in claim 17, wherein the filling-out is performed on a subscriber-specific basis; and the complete length of the first calculated response is shortened before transmission.

19. The method as claimed in claim 17, wherein the first calculated response is filled out with defined bits from an internally stored key to make up the length of the second challenge (Challenge 2).

20. The method as claimed in claim 17, wherein the second challenge (Challenge 2) corresponds to the first calculated response before it was shortened.

21. The method as claimed in claim 13, wherein the network is a GSM network.

22. The method as claimed in claim 13, wherein the network is a wire-based network.

23. The method as claimed in claim 22, wherein components in the wire-based network are different monitoring units of computers which authenticate themselves with a central computer, and vice versa.

24. The method as claimed in claim 13, wherein the authentication center calculates the triplet data sets requested by the network and transmits the calculated triplet data sets to the network off-line and independently of time, on request by the network, and before data interchange between the network and the terminal.

* * * * *